United States Patent
Curtis et al.

(10) Patent No.: US 6,825,960 B2
(45) Date of Patent: Nov. 30, 2004

(54) SYSTEM AND METHOD FOR BITWISE READOUT HOLOGRAPHIC ROM

(75) Inventors: Kevin R. Curtis, Longmont, CO (US); Brian M. King, Paxton, MA (US); William L. Wilson, Longmont, CO (US)

(73) Assignee: InPhase Technologies, Inc., Longmont, CO (US)

( * ) Notice: Subject to any disclaimer, the term of this patent is extended or adjusted under 35 U.S.C. 154(b) by 0 days.

(21) Appl. No.: 10/346,399

(22) Filed: Jan. 15, 2003

(65) Prior Publication Data

US 2003/0223101 A1 Dec. 4, 2003

Related U.S. Application Data

(60) Provisional application No. 60/349,146, filed on Jan. 15, 2002, provisional application No. 60/371,549, filed on Apr. 9, 2002, and provisional application No. 60/379,367, filed on May 9, 2002.

(51) Int. Cl.[7] ................................................. G03H 1/04
(52) U.S. Cl. ............................... 359/35; 359/3; 359/24; 369/103; 369/273
(58) Field of Search ........................... 359/1, 3, 35, 24, 359/25, 31; 369/103, 273, 292

(56) References Cited

U.S. PATENT DOCUMENTS

| | | |
|---|---|---|
| 3,417,454 A | 12/1968 | Beasley |
| 3,631,411 A | 12/1971 | Kosonocky |
| 3,761,155 A | 9/1973 | Lo et al. |
| 3,905,778 A | 9/1975 | Pearson |
| 3,932,148 A | 1/1976 | Krewalk, Sr. |
| 4,183,545 A | 1/1980 | Daly |
| 4,220,491 A | 9/1980 | Metcalf et al. |
| 4,470,856 A | 9/1984 | Little et al. |
| 4,506,184 A | 3/1985 | Siddall |
| 4,537,827 A | 8/1985 | Little et al. |
| 4,579,616 A | 4/1986 | Windischmann et al. |
| 4,737,824 A | 4/1988 | Sakai et al. |
| 4,945,215 A * | 7/1990 | Fukushima et al. ......... 235/457 |
| 4,986,641 A | 1/1991 | Braat |
| 5,054,683 A | 10/1991 | Haisma et al. |
| 5,131,968 A | 7/1992 | Wells et al. |
| 5,160,560 A | 11/1992 | Welkowsky et al. |

(List continued on next page.)

FOREIGN PATENT DOCUMENTS

| | | | |
|---|---|---|---|
| EP | 0 683 511 B1 | | 11/1995 |
| GB | WO 93/08565 | * | 4/1993 |
| WO | WO 95/11521 | | 4/1995 |
| WO | WO 03/021150 | | 3/2003 |

OTHER PUBLICATIONS

Barbastathis, G. and Psaltis, D. (2000). "Volume Holographic Multiplexing Methods" In *Holographic Data Storage*. Coufal, H. J. et al. eds., Springer–Verlag., pp. 21–62.

Dhar, L. et al. (2000). "Photopolymers for Digital Holographic Data Storage" In *Holographic Data Storage*. Coufal, H. J. et al. eds., Springer–Verlag., pp. 198–208.

Goodman, J. W. ed., (1968). *Introduction to Fourier Optics*. McGraw–Hill Book Company. (Table of Contents). pp. xi–xiii.

(List continued on next page.)

*Primary Examiner*—Leo Boutsikaris
(74) *Attorney, Agent, or Firm*—Morrison & Foerster LLP (57) ABSTRACT

According to one aspect a method for manufacturing a holographic storage medium includes providing one or more data masks with data to be recorded, illuminating the one or more data masks onto the medium with a plane wave object beam from a laser light source operating at a record wavelength, propagating a reference beam at an incident angle to the medium to record the one or more data masks on the medium, and altering the incident angle of the reference beam for each of the one or more data masks, wherein each of the one or more data masks recorded on said medium can be read bit by bit using a laser light source operating in a readout range of wavelengths different from the record wavelength.

30 Claims, 7 Drawing Sheets

U.S. PATENT DOCUMENTS

| | | | |
|---|---|---|---|
| 5,202,875 A | | 4/1993 | Rosen et al. |
| 5,326,420 A | | 7/1994 | Vinouze et al. |
| 5,433,911 A | | 7/1995 | Ozimek et al. |
| 5,438,439 A | * | 8/1995 | Mok et al. ............... 359/10 |
| 5,452,282 A | * | 9/1995 | Abraham ............... 369/103 |
| 5,515,167 A | | 5/1996 | Ledger et al. |
| 5,587,984 A | * | 12/1996 | Owa et al. ............... 369/103 |
| 5,670,009 A | | 9/1997 | Tarn et al. |
| 5,760,864 A | | 6/1998 | Yamada et al. |
| 5,795,430 A | | 8/1998 | Beeteson et al. |
| 5,932,045 A | | 8/1999 | Campbell et al. |
| 6,111,828 A | | 8/2000 | McLeod et al. |
| 6,156,415 A | | 12/2000 | Campbell et al. |
| 6,226,109 B1 | * | 5/2001 | Tompkin et al. ............... 359/2 |
| 6,252,686 B1 | | 6/2001 | Ando |
| 6,272,095 B1 | | 8/2001 | Liu et al. |
| 6,482,551 B1 | | 11/2002 | Dhar et al. |
| 2002/0015376 A1 | * | 2/2002 | Liu et al. ............... 369/103 |
| 2002/0071145 A1 | * | 6/2002 | Roh ............... 359/35 |
| 2002/0163872 A1 | * | 11/2002 | Roh et al. ............... 369/103 |
| 2003/0044577 A1 | | 3/2003 | Dhar et al. |
| 2003/0223100 A1 | * | 12/2003 | Anderson ............... 359/1 |

OTHER PUBLICATIONS

Hecht, E. ed., (1987). *Optics.* Second Edition. Addison–Wesley Publishing Company. (Table of Contents).pp. ix–x.

Hesselink, L. et al. (1993). "Optical Memories Implemented with Photorefractive Media," *Optical and Quantum Electronics* 25:S611–S661.

IBM Technical Disclosure Bulletin, (1989). "Device for Planarizing Structured Surfaces," 32(5A):402–403.

Ingwall, R.T. and Waldman, D. (2000). "Photopolymer Systems" *In Holographic Data Storage.* Coufal, H. J. et al. eds., Springer–Verlag., pp. 170–197.

Kostuk, R. K. et al. (2000). "Beam Conditioning Techniques for Holographic Recording System" *In Holographic Data Storage.* Coufal, H. J. et al. eds., Springer–Verlag., pp. 258–269.

Landau, L. D. and Lifshitz, E. M. eds., (1986). *Theory of Elasticity.: vol. 7 of Course of Theoretical Physics.* Third English Edition. Pergammon Press. p. 44.

Li, H–Y. S. and Psaltis, D. (1994). "Three–Dimensional Holographic Disks," *Applied Optics* 33(17):3764–3774.

Pappu, S.V. (1990). "Holographic Memories; A Critical Review," *Int. Journal of Optoelectronics* 5(3):251–292.

Psaltis, D. and Mok, F. (1995). "Holographic Memories," *Scientific American* 70–76.

Pu, A. et al. (1994). "A New Method for Holographic Data Storage in Photopolymer Films," *IEEE/IEOS 1994, Symposium,* pp. 433–435.

Saito, K. and Horimai, H. (1998). "Holographic 3–D Disk using In–Line Face–to–Face Recording," *Optical Media Laboratory,* Sony Corporation. pp. 162–164.

Sincerbox, G. T. (2000). "History and Physical Principles" *In Holographic Data Storage.* Coufal, H. J. et al. eds., Springer–Verlag., pp. 3–20.

Van Heerden, P.J. (1963). "Theory of Optical Information Storage in Solids," *Applied Optics* 2(4):393–400.

International Search Report mailed May 20, 2004, for PCT patent application No. PCT/US03/35425 filed on Nov. 4, 2003, 6 pages total.

* cited by examiner

SYSTEM AND METHOD FOR BITWISE READOUT HOLOGRAPHIC ROM

CROSS REFERENCE TO RELATED APPLICATIONS

The present application claims benefit of earlier filed provisional applications: U.S. Ser. No. 60/349,146, entitled "Backward Compatible Holographic ROM and replication with different wavelength then readout," filed on Jan. 15, 2002; U.S. Ser. No. 60/371,549, entitled "Backward Compatible Holographic ROM and replication with different wavelength then readout," filed on Apr. 9, 2002; and U.S. Ser. No. 60/379,367, entitled "Backward Compatible Holographic ROM and replication with different wavelength then readout with temperature based laser diode," filed on May 9, 2002, all of which are incorporated herein in their entirety by reference.

BACKGROUND

1. Field of the Invention

The present invention relates to the general field of holographic storage systems and methods. More specifically the invention relates to a system and method for a bitwise readout of a holographic ROM that may be backward compatible to existing or future storage formats such as DVD or CD-ROM.

2. Description of Related Art

General holographic storage systems are discussed in "Holographic Memories," by Demetri Psaltis et al., *Scientific American*, November 1995, which is hereby incorporated by reference. Holography is also discussed in the text Holographic Data Storage, by H. J. Coufal, D. Psaltis, and G. T. Sincerbox, Eds., copyright 2000, Springer-Verlag which is hereby incorporated by reference. The basic principles of holography involve the recording of an interference pattern formed between two beams of light, referred to as an object beam and a reference beam. The object beam is encoded with data in a two dimensional pattern. The reference beam is used to form the interference pattern with the encoded object beam and is subsequently used to reconstruct the data by illuminating the recorded pattern.

In volume holographic storage, a large number of holograms are stored in the same volume region of a holographic storage medium. There are several method of holographic storage, such as shift multiplexing, angle multiplexing, wavelength multiplexing, correlation multiplexing and phase multiplexing. Volume holography uses a thick recording medium, where the thickness dimension is associated with Bragg selectivity in the movement of the holographic storage medium in shift multiplexing or the angle change in angle multiplexing.

A prior art holographic system is described in "Holographic 3-D Disc using In-line Face-to-Face Recording," by Kimihiro Saito and Hideyoshi Horimai. The system described utilizes a photosensitive layer with a reflecting unit underneath. A reference beam passes through a first region of the media downward and a second region upwards. The direction of the information beam is opposite to that of the reference beam. Intersection between the reference beam and information beam results in a reflection type hologram. Shift multiplexing can be utilized for multiple recording.

Angle multiplexing is a volume holography method for storing a plurality of images within a single storage medium. Such angle multiplexing is discussed, for example, in "Holographic Memories," by Demetri Psaltis et al., *Scientific American*, November 1995, and by P. J. van Heerden in, "Theory of Optical Information Storage In Solids," *Applied Optics*, Vol. 2, No. 4, page 393 (1963). A typical system employing angle multiplexing described in "Holographic Data Storage," pages 343–397, by H. J. Coufal, D. Psaltis, and G. T. Sincerbox, Eds., copyright 2000, Springer-Verlag. Angle multiplexing generally involves storage of multiple pages of data in the same photorecording medium by altering the angle of the reference beam entering the media during storage of each page while maintaining the position of the object beam. Each hologram is stored in the same volume and is differentiated by Bragg selectivity. Bragg selectivity during angle multiplexing is described in Holographic Data Storage, pages 30–38, by H. J. Coufal, D. Psaltis, and G. T. Sincerbox, Eds., copyright 2000, Springer-Verlag. Any of the recorded holograms can be viewed by illuminating the photorecording medium with a reference beam set at the appropriate angle.

Wavelength multiplexing is a further method for storing a plurality of images within a single medium, whereby the addressing mechanism is the wavelength of incidence of the reference beam. Wavelength multiplexing is simpler to implement than angle multiplexing, but it is highly dependent on the range over which lasers can be tuned. Wavelength multiplexing is described in "Holographic Data Storage," pages 7–8 and 25–26, by H. J. Coufal, D. Psaltis, and G. T. Sincerbox, Eds., copyright 2000, Springer-Verlag.

A prior art system geometry in which the encoded object beam and the recording reference beam are counterpropagating is described in "Volume Holographic Multiplexing Methods", by G. Barbastathis and D. Psaltis, published in Holographic Data Storage, pages 22–59, by H. J. Coufal, D. Psaltis, and G. T. Sincerbox, Eds., copyright 2000, Springer-Verlag, which is expressly incorporated herein by reference. This geometry is often preferred in wavelength multiplexed systems because it maximizes the optical wavelength Bragg selectivity.

Figure 5:
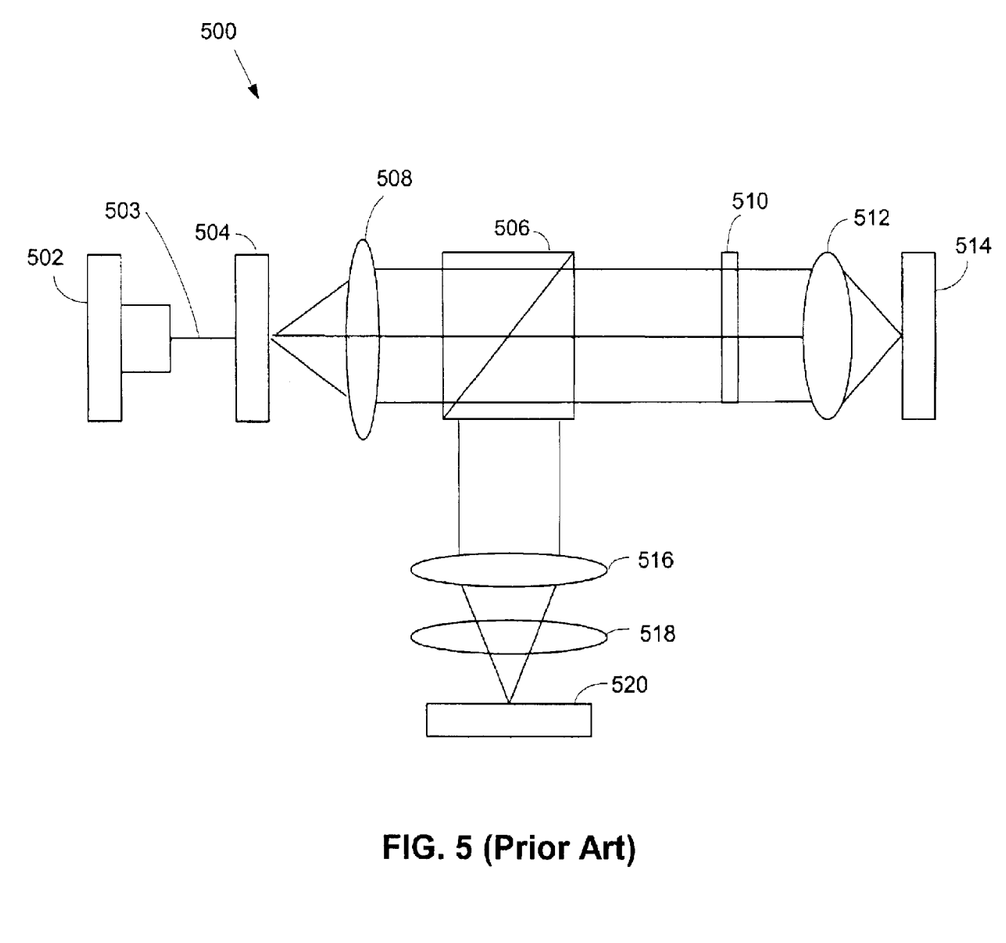
FIG. 5 is an illustration of a prior art optical read head.

Compact discs (CDs) and digital video disks (DVDs) are currently popular optical recording formats. Both CD and DVD players are readily available at low cost. FIG. 5 illustrates the basic setup of a typical read system utilized to recall data stored on an optical media such as a CD or DVD. The read system 500 includes a laser light source 502, which provides a plane wave readout beam 503. The readout beam from the laser light source 502 travels through a diffraction grating 504, a collimator 508, a beam splitter 506, quarter waveplate 510, and objective lens 512. Objective lens 512 focuses the readout beam onto a reflective layer 514 that is the bottom layer of the CD or DVD containing data. Readout beam 503 is a spherical beam passing through objective lens 512. Readout beam 503 is reflected or not reflected depending on the data, with the reflected readout beam 503 a spherical wave off the reflective layer 514.

The readout beam is then reflected back through objective lens 512, quarter wave plate 510, and to the beam splitter 506. A plane wave is produced after the reflected spherical beam retro-reflects through objective lens 512. The readout beam is reflected towards lens 516 and is imaged onto the plane of an optical detector 520, which is typically a quad detector. Laser light source 510 is generally a low power (5–10 mW), relatively inexpensive laser with multiple longitudinal mode emission. Collimator lens 508 is placed a distance away from the laser, on the opposite side of the beam splitter 506 from the laser. Readout beam 503 diverges rapidly, resulting in the collimator lens 508 illuminated by the central core of readout beam 503. In addition to beam splitter 506, a beam-turning element may be placed between laser 502 and collimator lens 508 in order to flatten the system profile for use in a compact drive. After the readout beam 503 passes through collimator lens 508, it is well collimated and can be focussed by objective lens 512. The reflected readout beam is recollimated by objective lens 512 and proceeds back through the collimator lens 508, which acts as a field lens. The reflected readout beam is deflected by the beam splitter and focussed on the detector, which senses the high-frequency data signal as well as tracking and focus error signals. It should be recognized that FIG. 5 is illustrative only. Current read systems or optical pick-up systems typically combine various elements to reduce the number of elements and cost of the system.

Additionally, the current use of holography in commercial ROM systems and storage media is on the backside (i.e., the side opposite the reflective layer) of the CD or DVD. Here single holograms of pictures and words (e.g., names or titles) are sometimes recorded for security or authenticity reasons.

Although prior art DVD and CD players are readily available, low cost players that can also read holographic ROM discs are not available. Furthermore, ROM disc replication is done by stamping the information onto the surface of the disk. Thus, there has been a need for improvements in the recording (replication of the information efficiently and quickly) and readout of holograms. More specifically, there has been a need for improved systems capable of reading holograms and other optical media.

SUMMARY OF THE INVENTION

According to one example of one aspect of the present invention a method is provided for manufacturing a holographic storage medium. The method includes providing one or more data masks with data to be recorded on a holographic storage medium, illuminating the one or more data masks onto the holographic storage medium with a plane wave object beam from a laser light source operating at a record wavelength, propagating a reference beam at an incident angle to the holographic storage medium to record the one or more data masks on the holographic storage medium, and altering the incident angle of the reference beam for each of the one or more data masks, wherein each of the one or more data masks recorded on said holographic storage medium can be read bit by bit using a laser light source operating in a readout range of wavelengths different from the record wavelength.

According to another example of an aspect of the present invention a method is provided for manufacturing a holographic storage medium including providing one or more data masks with data to be recorded on a holographic storage medium, propagating a plane wave object beam and reference beam from a laser light source operating at a first range of record wavelengths, illuminating the one or more data masks onto the holographic storage medium with the object beam, propagating the reference beam at fixed incident angle to the holographic storage media to record the one or more data masks on the holographic storage media, and altering the record wavelength of the object beam and reference beam for each of the one or more data masks, wherein each of the one or more data masks recorded on said holographic storage medium can be read bit by bit using a laser light source operating in a readout range of angles different from the first range of record angles.

The present invention is better understood upon consideration of the detailed description below in conjunction with the accompanying drawings and claims where various other examples and aspects of the present invention are described in greater detail.

DESCRIPTION OF THE DRAWINGS

The features and advantages of the system and method of the present invention will be apparent from the following description in which.

DETAILED DESCRIPTION OF THE PREFERRED EMBODIMENTS

The present invention provides a solution to the needs described above through a system and method for a backward compatible holographic ROM. One aspect of the present invention provides a method for replicating holographic ROM discs with a different record wavelength than readout wavelength. Another aspect of the present invention presents an optical read head with simplified optics that can read holographic ROM discs as well as common optical recording mediums such as compact discs (CDs) or digital video disks (DVDs).

Still other examples of the present invention will become apparent to those skilled in the art from the following detailed description, wherein is shown and described only the examples of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

Figure 1:
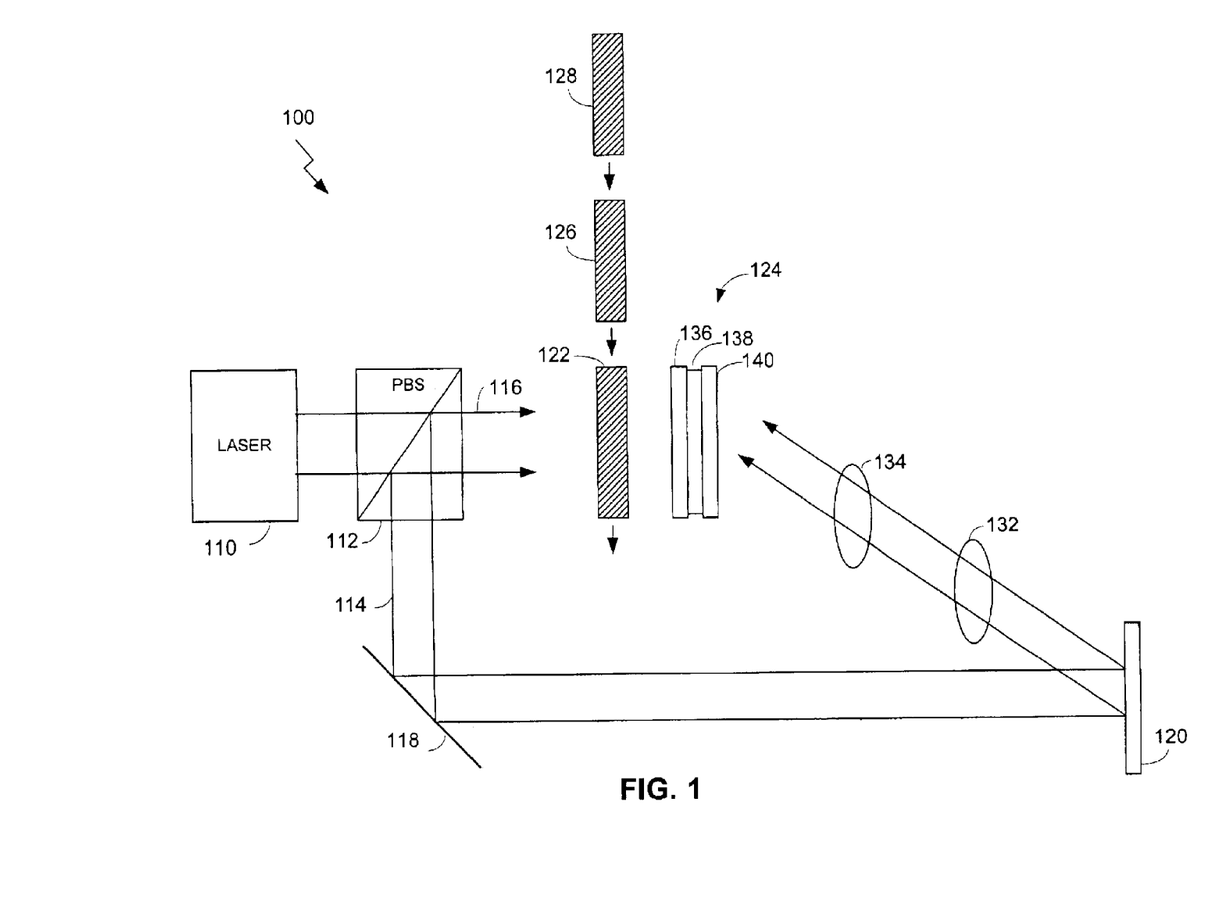
FIG. 1 is a schematic block diagram of an apparatus suitable for use in fabricating a backward compatible holographic ROM disc.

Referring to FIG. 1, a block diagram of a basic configuration utilizing an example of the system for fabricating backward compatible holographic ROM storage media is shown. The holographic storage system 100 of the present invention may be constructed using discrete optical components, such as lasers, lenses and mirrors. The holographic storage system 100 includes a laser light source 110. The coherent light from the laser light source 110 is split into a reference beam 114 and an object beam 112. The reference beam 114 and object beam 112 are directed to a holographic storage medium 124 where they interfere to record a hologram. A data mask 122 containing a data pattern is placed in proximity to the holographic storage medium 124 and illuminated with the object beam 116 onto the holographic storage medium 124. The data mask 122 may be in contact or offset from the storage medium 124. Additionally, the object beam 116 could be imaged onto the storage medium 124 with lenses or the like. Several data masks may be stored within the holographic storage medium 124 utilizing multiplexing techniques.

In addition to angle multiplexing and wavelength multiplexing discussed above, confocal multiplexing may also be performed by varying the distance of the data mask 122 or the image of the data mask from the storage medium 124 between recordings. With filtering on readout the data may be confocally detected in manner similar to that performed with confocal microscopes. Further description of confocal detection is described in greater detail in U.S. Pat. Nos. 6,111,828 and 5,202,875, both of which are hereby incorporated by reference. Confocal multiplexing techniques may be advantageously combined with volume holographic multiplexing techniques as described above. One potential advantage of holographically implementing multiple layers (image planes) is that the layers do not have to physically be on the storage medium. For example, with current multilevel CD or near-field or high na systems, the data layers are on or inside the media. By imaging or placing the data mask of the data, the layers (masks) can appear to a drive as being located outside of the storage medium, inside the medium, or on the medium depending on where the data mask image plane lies during recording. Thus, the usual problem of compensating for spherical aberration due to the change in the amount of substrate that the light travels through may not be necessary.

Following is a description of an exemplary method and system for encoding and directing the object beam and reference beam, although other schemes may be used without departing from the intended scope of the present invention. Light generated by laser light source 110 is directed to a beam splitter 112, such as a polarizing beam splitter cube, which splits the light from laser light source 110 into a reference beam 114 and an object beam 116. In this example, both object beam 116 and reference beam 114 are plane waves. Reference beam 114 is reflected by a turning mirror 118 to a rotatable mirror 120, which directs the reference beam in to a holographic storage media 124 via lenses 132 and 134 in a counterpropagating direction from the object beam 116.

Plane wave object beam 116 is directed to a data mask 122, illuminating at least a portion or the data mask 122 onto the holographic storage medium 124. In one example of the invention, data mask 122 is the size of standard 120 cm diameter CD or DVD, and plane wave object beam 116 is of appropriate size to illuminate the entire data mask 122. Object beam 116 and counterpropagating reference beam 114 interfere within holographic storage medium 124 to produce a reflection order hologram.

Holographic storage medium 124 is a disc similar in size to a conventional CD or DVD in one example of the invention. Alternatively, it can be a card, tape, or any other convenient format in which other optical media are fabricated. The holographic storage medium 124 comprises a first protective substrate 136, a photopolymer 138, and a second protective substrate 140. The substrates are advantageously selected from glass, sapphire, polycarbonate, plastic, and quartz. Any other material that is transparent to the wavelength being used in the holographic storage system, and which has adequate mechanical properties for a holographic storage system, may also be used as a substrate. The photopolymer layer may include a photopolymer material that is capable of recording the interference pattern. Use of photopolymers in holographic storage systems are discussed, for example, in "Holographic Data Storage," pages 172–208, by H. J. Coufal, D. Psaltis, and G. T. Sincerbox, Eds., copyright 2000, Springer-Verlag. Other examples of high quality photopolymers that may be used are described in U.S. Pat. No. 6,482,551, which is hereby incorporated herein in its entirety by reference. It is also desirable that the optical quality of the disk by fairly high, e.g., <1 wavelength of power per $cm^2$, to achieve good image reconstruction and good Bragg selectively. U.S. Pat. No. 5,932,045 describes an exemplary method for fabricating high quality media and is incorporated herein in its entirety by reference.

Data mask 122 encodes the object beam 116 and is a transmissive data mask in one example of the invention, and can may include an amplitude mask, phase mask, or any combination of an amplitude and phase mask. Data mask 122 may contain information similar to that found on a conventional digital video disc, light and dark spots corresponding to 1s and 0s, data tracks, and servo patterns in the data. Amplitude and phase masks are well known to those of ordinary skill in the art, for example, amplitude and phase masks are discussed in "Holographic Data Storage," pages 259–269, by H. J. Coufal, D. Psaltis, and G. T. Sincerbox, Eds., copyright 2000, Springer-Verlag.

In this example, successive data masks are stored in the holographic storage media utilizing a procedure in which each data mask is effectively wavelength multiplexed for readout purposes and the readout wavelength is different from the record wavelength of laser 110. This allows for high storage capacity; for example, if each holographic recording is at typical DVD density and capacity (i.e., 4.7 GB), 25 recordings will allow for approximately 100 GB to be quickly stored in the storage media. One method for implementing wavelength multiplexing in the prior art involves sweeping the wavelength of laser 110 through successive wavelengths, with each wavelength utilized to record a different data mask. An example of the present invention utilizes a fixed wavelength laser 110 combined with altering the incident angle of the reference beam 114 in a manner-similar to angular multiplexing in order to produce wavelength multiplexed data masks stored in the holographic storage media 124 that can be read with a laser operating at a different wavelength than the record wavelength.

Following recording of data mask 122 as described above, data mask 122 is removed and data mask 126 is placed in proximity to holographic storage media 124. The wavelength of laser 110 remains fixed. A lens 132 and lens 134 are located between mirror 120 and holographic storage media 124, and mirror 120 is rotatable. Mirror 120 is a rotatable beam deflector used in conjunction with imaging lens 132 and 134 to scan the angle of the reference beam to implement effective wavelength multiplexing. Mirror 120, lens 132, lens 134, and the photorecording medium 124 are in a 4-F configuration: lens 132 and 134 are separated by the sum of their focal lengths, with two dimensional input and output planes located one focal length in front of the lens pair at the mirror 120 and one focal length behind the lens pair at the photorecording medium 124. As mirror 120 rotates, the angle of reference beam 114 reflecting from the mirror 120 changes, resulting in a change of the angle of incidence of the reference beam at the photorecording medium 124 while the location remains the same. During the recording process, the reference beam is scanned through a different reference angle for each data mask. The present invention effectively implements wavelength multiplexing with the holographic storage media 124 in this manner.

In the prior art, wavelength multiplexed holograms utilizing a SLM required that the readout wavelength match the record wavelength for each wavelength. Such holograms have a field of view, and if a different readout wavelength was utilized, only a portion of the recorded hologram could be bragg-matched and thus readout at a different wavelength than recording was infeasible. In the present invention, an entire disc may be recorded at a time. The angles are varied during recording and a single angle readout beam with different wavelengths may be used on readout. During readout, readout occurs bit by bit, similar to that of a conventional CD or DVD. During readout, a spherical wave readout beam is propagated incident to the holographic storage media. The spherical wave is sufficiently bragg-matched to readout the reflection hologram, and the reflection hologram is output as a quasi plane wave, since a quasi plane wave was utilized to record the hologram. Readout is possible with a different readout wavelength from the record wavelength because there is a much smaller field of view as long as the gratings are matched because only one bit is being readout at a time.

In one example of the invention, the wavelength of laser 110 is in the green range, e.g., approximately 532 nm, and the readout wavelength is in the red range, approximately 630–800 nm corresponding to approximately 630–690 nm for a typical CD player and approximately 780 nm for a typical DVD player. Thus, a typical red laser found in CD and DVD players can be utilized to readout holograms that were recorded in green. The use of a green wavelength laser 110 for recording provides more power and better quality in the fabrication process. However, the use of such high quality green wavelength lasers 110 in commercially available players is economically infeasible. Thus, the present invention provides for the ability to use a lower cost red laser found in CD and DVD players for readout.

Figure 2:
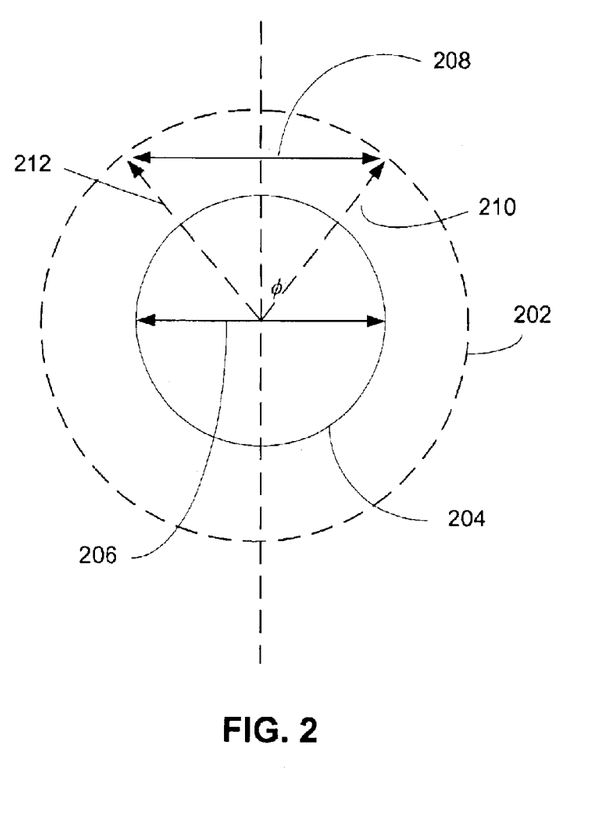
FIG. 2 is a k-space diagram illustrating an identical grating recorded at different wavelengths.

Referring to FIG. 2, a k-space or k-sphere diagram showing an identical grating recorded at different wavelengths is shown, illustrating how altering the angle of a fixed wavelength reference beam 114 with rotatable mirror 120 allows for matching of readout wavelengths. See "Holographic Data Storage," pages 21–59, by H. J. Coufal, D. Psaltis, and G. T. Sincerbox, Eds., copyright 2000, Springer-Verlag (incorporated by reference) for more details on the relationship of angle and wavelength multiplexing and k-sphere diagrams. A momentum vector k=2 pi divided by the wavelength with a direction. A wave propagating though space must lie on an isotropic media. All indices normal the same-across any direction lie on a sphere, defining a propagating mode with a length and vector.

A sphere 202 represents a first wavelength, and a smaller sphere 204 represents a second wavelength, where the first wavelength is shorter than the second wavelength. The radius of the sphere is determined by 2πn/wavelength, where n is the refractive index of the recording material. A holographic storage media lies in the middle of sphere 204 and sphere 202. Two plane waves travelling in different directions, e.g., a signal beam travelling to the left and a reference beam travelling to the right, produce a grating vector 206 with a given length. Interference produces a sinusoidal intensity variation with a given period, with the period determined by the angle of intersection and the wavelength of the two plane wave beams. Trading angle from wavelength produces gratings with the same period. To readout at the second wavelength, the second wavelength is a longer wavelength (i.e., redder) that makes the momentum sphere smaller, it is desired to obtain the same length in the grating period by recording on the larger sphere (i.e., bluer). Physically this is associated with the recorded period, i.e. the period between dark and light regions in the holographic storage medium. Rather than having a retro-reflection at the first wavelength, if the first wavelength incident beam 210 and first wavelength reference beam 212 are at an off angle Φ, with both the same side of normal, a grating 208 is written that is unslanted with the same length, and therefore the same period, as with the counterpropagating second wavelength grating 206. The relationship between wavelength and off-angle is well defined. Thus, an entire data mask can be recorded at a first wavelength or another wavelength and the length matched by choosing the correct angle for the difference in wavelength so the data can be read out in a second wavelength. Therefore, when one bit is read out, a limited field of view does not require that the readout wavelength match the record wavelength.

In one example of the invention, the first wavelength is in the green wavelength range and the second wavelength is in the red wavelength range. This allows for a generally higher quality green wavelength laser to be used to replicate holographic ROM discs and a conventional, low cost red wavelength laser to be used to readout the data recorded with the green wavelength laser. Preferably the difference between the first and second wavelengths is less than approximately 200 nm. A sphere 202 represents a green wavelength, and a smaller sphere 204 represents a red wavelength. A holographic storage media lies in the middle of sphere 204 and sphere 202. Two plane waves travelling in different directions, a signal beam travelling to the left and a reference beam travelling to the right, produce a grating vector 206 with a given length. Interference produces a sinusoidal intensity variation with a given period, with the period determined by the angle of intersection and the wavelength of the two plane wave beams. Trading angle from wavelength produces gratings with the same period. To record in green, where green is a longer wavelength that makes the momentum space larger, it is desired to obtain the same length in the grating period. Physically this is associated with the recorded period, i.e. the period between dark and light regions in the holographic storage medium. Rather than having a retro-reflection in green, if the green incident beam 210 and green reference beam 212 are at an off angle phi, with both the same side of normal, a grating 208 can be written that is unslanted with the same length, and therefore the same period, as with the counterpropagating red grating 206. Thus, an entire data mask can be recorded in green or another color and the length matched by choosing the correct angle for the difference in wavelength so the data can be read out in red or another wavelength different that the recorded wavelength. When one bit is read out, a limited field of view does not require that the readout wavelength match the record wavelength.

Figure 1A:
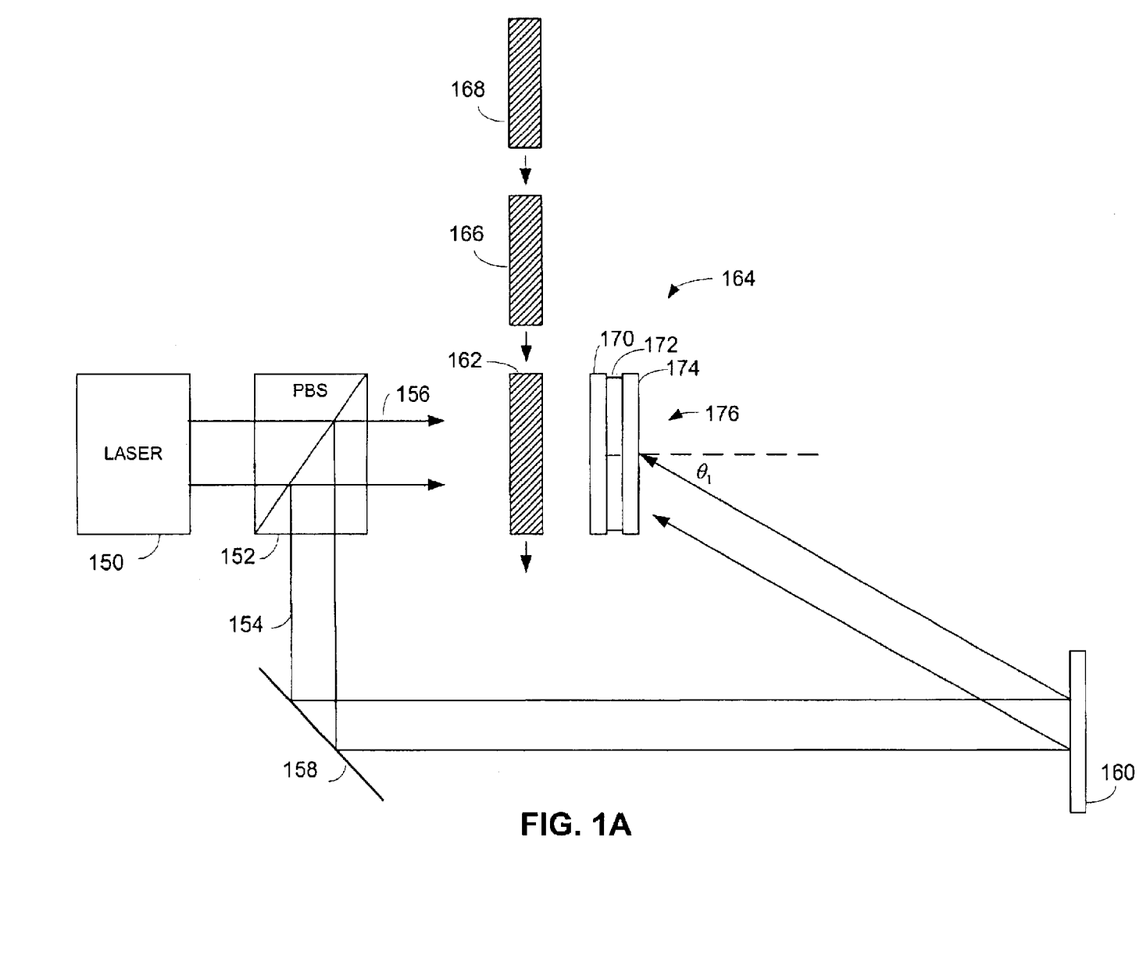
FIG. 1A is a schematic block diagram of a further example of an apparatus suitable for use in fabricating a backward compatible holographic ROM disc.

In a further example, wavelength multiplexing of successive data masks is implemented by altering the wavelength of laser 110 through a first range of wavelengths for each successive data mask. A readout laser is utilized operating in a different range of wavelengths. The readout laser may be a conventional red laser operating between approximately 630 and 690 nm (e.g., in a CD drive) or approximately 760 and 800 nm (e.g., in a DVD drive). Referring to FIG. 1A, a block diagram of a basic configuration utilizing a further example of the system for fabricating a backward compatible holographic ROM device is shown. The holographic storage system includes a laser light source 150. The coherent light from the laser light source 150 is split into a reference beam and an object beam. The reference beam and object beam are directed to a holographic storage medium where they interfere to record a hologram. A data mask 162 containing a data pattern is placed in proximity to the holographic storage media, and illuminated with the object beam onto the holographic storage medium. Several data mask patterns may be stored within the holographic storage medium utilizing multiplexing techniques.

Light generated by laser light source 150 is directed to a beam splitter 152 that splits the light from laser light source 150 into a reference beam 154 and an object beam 156. In this example, both object beam 156 and reference beam 154 are plane waves. Reference beam 154 is reflected by a turning mirror 158 to a mirror 160, which directs the reference beam in to a holographic storage media 164 at a fixed angle $\theta_1$ 176. One or more lenses may be utilized to focus the reference beam 154 onto holographic storage media 164.

Plane wave object beam 156 is directed to a data mask 162, illuminating the entire data mask 162 onto the holographic storage media 164. Data mask 162 may be the size of a standard 120 cm diameter CD or DVD, and plane wave object beam 156 of appropriate size to illuminate the entire data mask 162. Object beam 156 and counterpropagating reference beam 154 interfere within holographic storage media 164 to produce a reflection order hologram. Holographic storage media 164 is a disc similar in size to a conventional CD or DVD as described in the example above. Alternatively, it can be a card, tape, or any other convenient format in which other optical media are fabricated. The holographic storage media 164 comprises a first protective substrate 170, a photopolymer 172, and a second protective substrate 174. The substrates are advantageously selected from glass, sapphire, polycarbonate, plastic, and quartz. Any other material that is transparent to the wavelength being used in the holographic storage system, and which has adequate mechanical properties for a holographic storage system, may also be used as a substrate. The photopolymer layer includes a material to store the hologram. Preferably, both reference beam 154 and signal beam 156 are incident with the storage media 164 at approximately equal angles off normal to the media such that the reconstruct at a different wavelength may be performed normal to the storage media surface.

Data mask 162 encodes the object beam 162 and is a transmissive data mask in an example of the invention, and can be an amplitude mask, phase mask, or any combination of both. Data mask 162 can contain information similar to that found on a conventional digital video disc, light and dark spots corresponding to 1 s and 0 s, data tracks, and servo patterns in the data. Successive data masks are stored in the holographic storage media utilizing a procedure in which each data mask is effectively wavelength multiplexed for readout purposes and the readout wavelength is different from the record wavelength of laser 150. One method for implementing wavelength multiplexing in the prior art involves sweeping the wavelength of laser 110 through successive wavelengths, with each wavelength utilized to record a different data mask. An example of the present invention sweeps the wavelength of laser 150 through a first range of wavelengths, combined with directing the reference beam 114 at a fixed incident angle to the holographic storage media 164 in order to produce wavelength multiplexed data masks stored in the holographic storage media 124 that can be read with a laser operating at a different range of wavelengths than the first range of wavelengths of laser 150. Following recording of data mask 162 as described above, data mask 162 is removed and data mask 166 is placed in proximity to holographic storage media 164. The wavelength of laser 150 is tuned to a different wavelength than the prior wavelength used to record data mask 162. The incident angle $\theta_1$ 176 of reference beam 154 remains fixed. During the recording process, the wavelength of laser 150 is tuned to a different wavelength for each data mask. If the recording is done at a different wavelength than the readout wavelength, the wavelength is fixed and the angles of incidence may be changed on readout. For example, incident angle $\theta_1$ 176 of reference beam 154 is changed per each mask stored. These angle multiplexed holograms may be readout as wavelength multiplexed holograms at the readout wavelength. This may also be performed vice versa by recording wavelength multiplexed holograms in the mastering process and using angle multiplexing in the readout drive.

In another exemplary methods, instead of switching the various data masks 162, 166, etc., a holographic master data mask or holographic master could be recorded with either wavelength or angle multiplexing methods to store a set or subset of the various data masks to be stored. The hologram master data mask may be located at a similar position as the data masks 162, 166, etc., and different data masks readout out and recorded into the media 164 by changing the angle or wavelength incident onto the holographic master data mask. This allows for various data masks to be carefully aligned to each other in a master data mask and this alignment stored by recording them into the holographic master data mask. Then on replication (recording them into the media to be used with the drive) there is no need to physical move or align various data masks. The data masks could be stored near the image plane and then used typical data masks or stored near the Fourier Plane with an additional large lens used to image the holographic master data mask onto the storage media 164.

Figure 3:
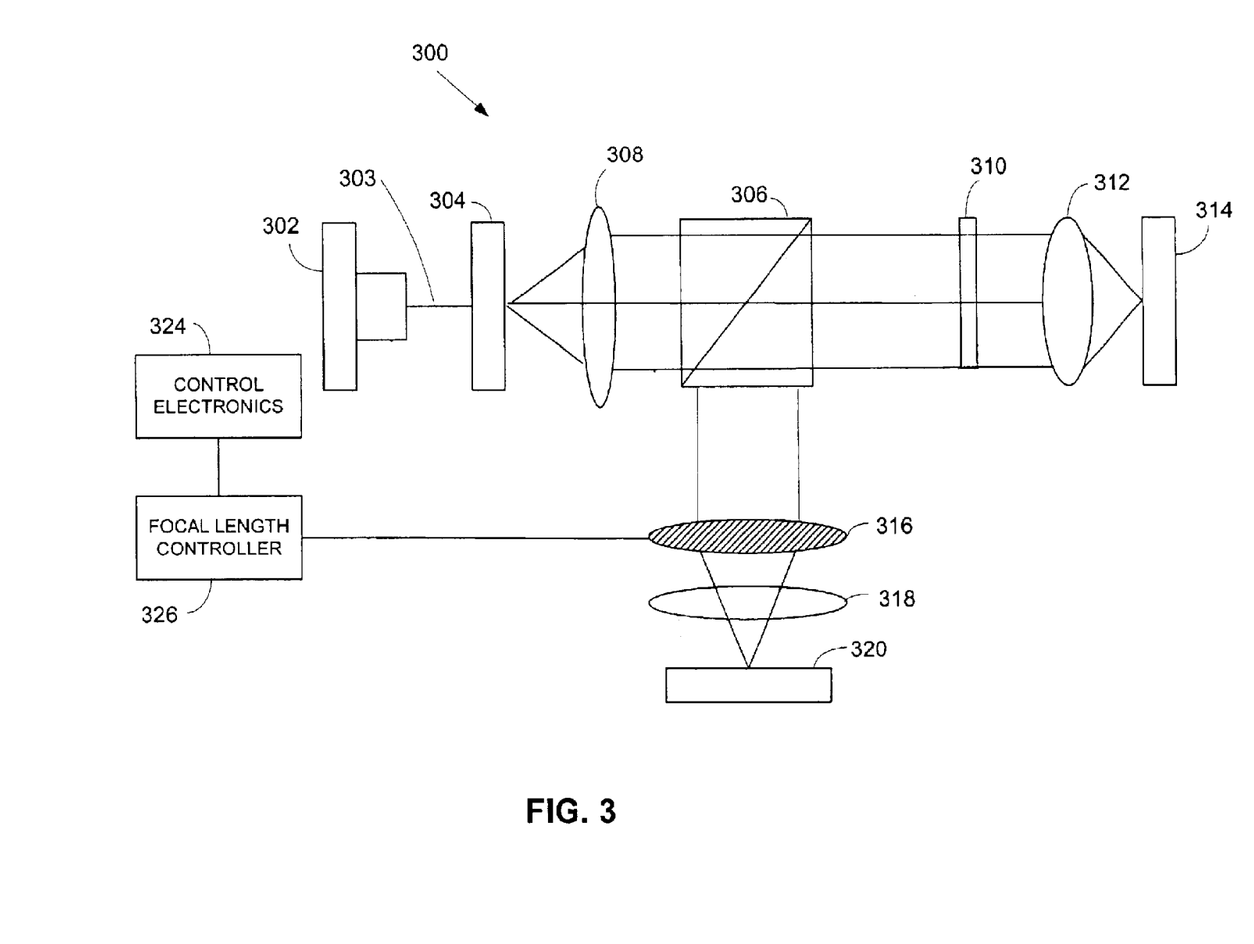
FIG. 3 is a schematic block diagram of a backward compatible holographic ROM disc read head of the present invention.

Referring to FIG. 3, a schematic block diagram of a backwards compatible holographic ROM disc read head 300 of the present invention is illustrated. The read head 300 includes a laser light source 302, diffraction grating 304, collimator 308, beam splitter 306, quarter waveplate 310, and objective lens 312. The read head may further include control electronics 324, a lens 316 with an adjustable focal length, a focal length controller for lens 316, lens 318, and optical detector 320.

Laser light source 302 provides a readout beam 303. The readout beam from the laser light source 302 travels through a diffraction grating 304, a collimator 308, a beam splitter 306, quarter waveplate 310, and objective lens 312. Objective lens 312 focuses the readout beam onto a target location on the optical storage medium 314, which may be a holographic storage media or other media such as a DVD or CD, on which the desired information was previously stored. For DVD's and CD's, objective lens 312 focuses the readout beam onto a reflective layer that is the bottom of the CD or DVD containing data. If the optical storage medium 314 is a holographic storage media, objective lens 312 focuses readout beam 303 at a point beyond the holographic storage media where a data mask-was located (or image of the data mask was located) during a replication process, as described above. Laser light source outputs a plane wave readout beam 303. Readout beam 303 is a spherical beam after passing through objective lens 512. Spherical readout beam 503 is reflected by the virtual holographic reflective surface, producing a retro-reflected quasi-plane wave utilized to recover the plane wave reference beam used in the replication process. The quasi-plane wave retro-reflects through objective lens 312 producing a semi-focused beam rather than a plane wave, as produced during readout of a CD or DVD. Proper imaging of the semi-focused beam onto a detector 326 requires the focal length of objective lens 312 or lens 316 to be adjusted. Diffraction of the reference beam with the previously stored hologram reconstructs the previously stored hologram.

The readout beam with the reconstructed hologram is retro-reflected back through objective lens 312, quarter wave plate 310, and collimator 308 to the beam splitter 306.

By searching for the right focus level for readout the type of storage media may be determined, for example, DVD, CD, holographic storage or the like. Additionally, header information may be used to determine the type of media. Format information from the header or otherwise may be provided to control electronics 324, which utilizes a focal length controller 326 to adjust the focal length of lens 316 depending on the format information. Control electronics 324 synchronizes the focal length controller 326 during readout. Control electronics 324 may include a processor and memory containing instructions for adjusting focal lengths depending on the storage media type. In one example, adaptive lens 316 has a voltage-controlled focal length, with the applied voltage controlled by focal length controller 326. Other examples of introducing variable focal length into a system includes moving lens 316 out of the beam path for CD and DVD storage media and within the beam path for readout of holographic media. The readout beam is reflected towards lens 316 and lens 318 and is imaged onto the plane of an optical detector 320, which is typically a quad detector. Optical detector 320 may be of conventional construction, for example a conventional photodiode array, quad detector or other suitable detector array. Laser light source 310 is generally a low power (5–10 mW), relatively inexpensive laser with multiple longitudinal mode emission. Readout beam 303 diverges rapidly, resulting in the collimator lens 308 illuminated by the central core of readout beam 303. In addition to beam splitter 306, a beam-turning element may be placed between laser 302 and collimator lens 308 in order to flatten the system profile for use in a compact drive. After the readout beam 303 passes through collimator lens 308, it is well collimated and can be focussed by objective lens 312. The reflected readout beam is recollimated by objective lens 312 and proceeds back through the collimator lens 308, which acts as a field lens. The reflected readout beam is deflected by the beam splitter and focussed on the detector with adjustable focal length lens 316. The present invention detects the format of optical storage medium 314 utilizing the storage media detector 322 and adjusts the focal length of adjustable focal length lens 316 using control electronics 324 and focal length controller 326. In one example, a holographic ROM disc has a header identifying the disc as a holographic disc in place of a conventional CD or DVD header. Other folding and combining of elements in the exemplary system described are possible as is known to those skilled in the art and is considered part of the invention.

The desired focal length is dependent, at least in part, upon objective lens 312, depth of the recorded hologram within holographic storage media 312, recorded data density, wavefront of the reference beam used to record the holograms, and laser wavelength. The desired change in focal length is greater than 10% in one example of the invention. For a given objective lens 312 and holographic storage medium 314, an interferometer is placed at the location of detector 320 to measure the readout beam wave-front and determine the desired focal length adjustment.

Figure 4:
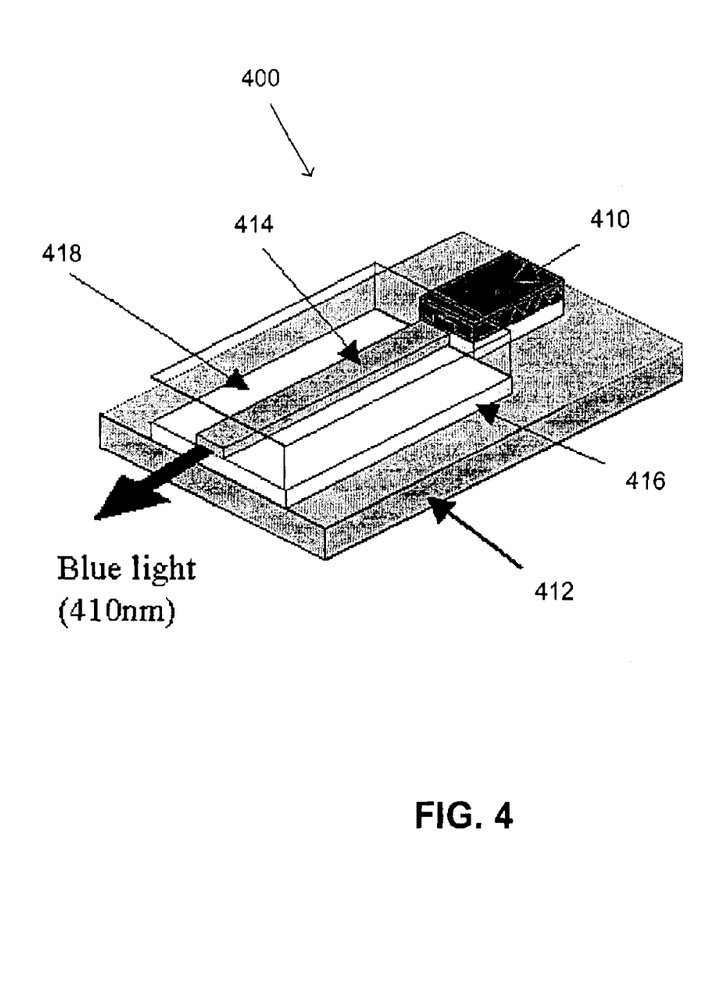
FIG. 4 is an illustration of an exemplary tunable laser diode.

In one example of the invention, laser 302 may include a tunable laser device 400 as illustrated in FIG. 4. Tunable laser device 400 may include, for example a tunable distributed Bragg reflector (DBR) laser diode 410 located over a silicon layer 412 and adjacent a waveguide 414 between a $SiO_2$ layer 416 and a second harmonic generation (SHG) device 418. The SHG device 418 operates to split the wavelength of the light source. For example, 850 nm light emitted from the laser diode 400 may be split into an emitted blue light of 410 nm. The emitted light may be further tuned by changing the voltage applied to the SHG device 418. Exemplary SHG blue laser devices are produced by Matsushita Electric Industrial Co., Ltd., of Japan.

Figure 4A:
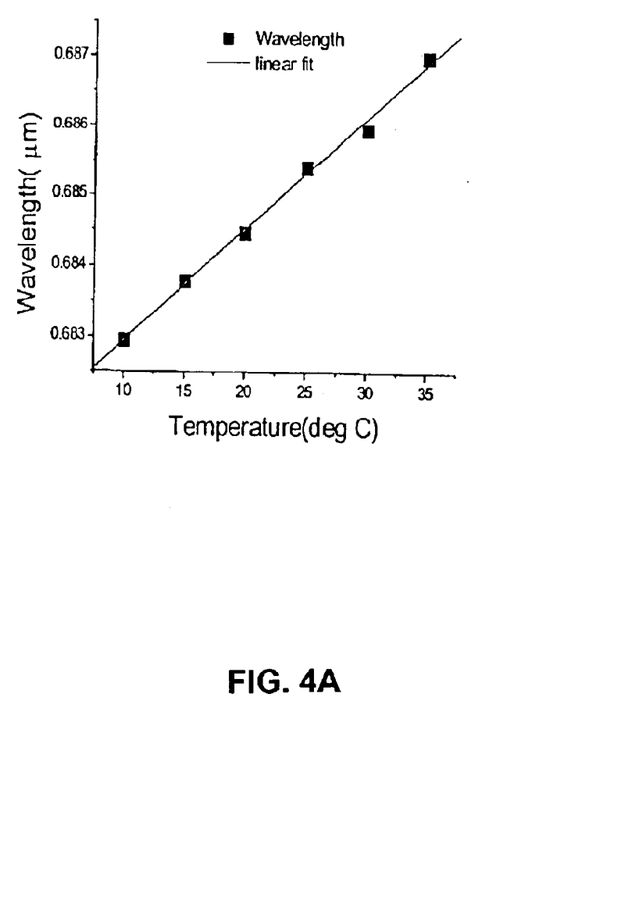
FIG. 4A is an illustration of the operation of a temperature dependent laser diode.

In one example, the output wavelength of the tunable diode laser 400 is dependent on the temperature of the diode. A graph of the wavelength as a function of temperature for an exemplary laser 400 is illustrated in FIG. 4A. The temperature of the diode may be current controlled to effect a desired wavelength. FIG. 4A shows an exemplary DVD red diode laser output as the temperature is varied. Thus, simple control and feedback of laser 301 based on signal quality can be used to servo a low cost laser to different wavelengths.

It should be recognized that various other methods for tuning a laser may be used as are known in the art. Further, in other exemplary systems a series of discrete laser sources may be used to achieve a range of readout wavelengths. The relatively low cost and wide spectral ranges available for laser diodes makes several devices a viable design choice. For example, 630 nm, 650 nm, 680 nm, and 780 nm devices are readily available. In addition, 410–425 nm devices are becoming readily available.

Current optical formats (DVD and CD) commonly have a holographic layer on the backside of the disc (other side of the metal reflective layer). This holographic layer typically includes embossed or recorded holograms that contain logos, company and product names, and visual pictures for security and anti-forgery reasons. The methods and systems above can be combined with standard CD or DVD media to perform these same duties. Using the holographic layer of a CD or DVD the header and initial servo information may be recorded with a security key or other data. The information may be recorded into the holographic layer such that the information is at the right depth to be read by an optical pickup when the disc is inserted into a typical CD or DVD drive upside down. Thus, the disc could be inserted upside down such that the information in the holographic layer may be read to verify the disc as being authentic. Thereafter the disc may be taken out and put into the drive with the standard side up and the data read conventionally. The holographic layer could still contain visual pictures and words. The header and initial servo information for the CDs and DVDs may be included on the inner rings of information.

The combination of standard optical formats and holographic storage described herein would preferably be implemented without any hardware changes to the drive (i.e., no additional lenses). In applications where only one or two layers would be used for holographic storage only a small amount of disc area would be used. The change in focus between holographic media and CD or DVD media may be achieved by having a non-plane wave reference beam. This would match approximately what the expected reflection from CD or DVD media surface would be and therefore no additional optics would be necessary. Unfortunately, a reference beam with power or many power elements decreases the angular and wavelength selectivity so that only a few layers would be possible. In one example, a black or absorbing layer may be disposed between the metal layer (CD/DVD layer) and the holographic layer to increase the signal-to-noise ratio for the holographic readout. Holographic information stored in a single layer for security purposes could be recorded as described above, at the same wavelength as readout. Further, because the information may be stored in a single layer, the information could be stamped or embossed into the holographic layer.

Having described the invention in terms of a preferred embodiment, it will be recognized by those skilled in the art that various types of general-purpose optical hardware may be substituted for the configuration described above to achieve an equivalent result. For example, the examples discussed herein include descriptions of particular optical elements. It will be apparent to those skilled in the art that modifications and variations of the preferred example are possible, and that other optical elements may be used to perform equivalent functions, all of which fall within the true spirit and scope of the invention as measured by the following claims.

What is claimed is:

1. A method for manufacturing a storage medium comprising:
   holographically storing data in a holographic storage layer of a storage medium, wherein
      the holographically stored information is accessible in a bitwise fashion, and the storage medium includes an optical storage layer for storing information.

2. The method of claim 1, wherein the optical storage layer includes at least one of CD and DVD storage format.

3. The method of claim 1, wherein the holographic layer is accessible from a first side of the storage medium and the optical storage layer is accessible from a second side of the storage medium.

4. The method of claim 1, wherein an absorbing layer is disposed between the optical storage layer and the holographic layer.

5. The method of claim 1, wherein the holographic layer contains at least one of header information, servo information, or security information.

6. The method of claim 1, wherein the holographic layer and optical storage layer are accessible by the same optics.

7. The method of claim 1, further including storing information in the optical layer according to a DVD or CD storage format.

8. The method of claim 1, wherein the storage medium includes an optical disc.

9. The method of claim 1, wherein the storage medium includes a CD.

10. The method of claim 1, wherein the storage medium includes a DVD.

11. The method of claim 1, wherein the act of holographically storing data in the holographic storage layer includes using a light source that is approximately 532 nanometers.

12. The method of claim 1, wherein the holographically stored data is accessible with a readout wavelength of approximately 630 to 800 nanometers.

13. The method of claim 1, wherein the holographically stored data is accessible with a readout wavelength of 630–690 nanometers.

14. The method of claim 1, wherein the holographically stored data is accessible with a readout wavelength of 760 to 800 nanometers.

15. The method of claim 1, wherein the holographically stored data is accessible with a readout wavelength greater than a wavelength used to holograhpically store the data.

16. The method of claim 1, wherein the holographically stored data is used to authenticate the storage medium.

17. The method of claim 1, further including storing an image in the holographic storage layer.

18. An optical storage medium, comprising:
   an optical storage layer having data stored therein; and
   a holographic storage layer having data stored therein, wherein the holographically stored data is accessible in a bitwise fashion.

19. The storage medium of claim 18, wherein the optical storage layer includes data stored in a CD storage format.

20. The storage medium of claim 18, wherein the holographic storage layer is included with a CD.

21. The storage medium of claim 18, wherein the optical storage layer includes data stored in a DVD storage format.

22. The storage medium of claim 18, wherein the holographic storage layer is included with a DVD.

23. The storage medium of claim 18, wherein the holographic storage layer includes data that may be read out bitwise.

24. The storage medium of claim 18, wherein the holographic storage layer includes header and initial servo data.

25. The storage medium of claim 18, wherein the holographic storage layer includes security data.

26. The storage medium of claim 18, wherein the holographic storage layer includes authentication data.

27. The storage medium of claim 18, wherein the holographic storage layer includes at least one image.

28. The storage medium of claim 18, wherein the holographic layer is accessible from a first major side of the storage medium and the optical storage layer is accessible from a second major side of the storage medium opposite the first major side.

29. The storage medium of claim 18, further comprising an absorbing layer disposed between the optical storage layer and the holographic storage layer.

30. The storage medium of claim 18, wherein data stored in the holographic storage layer and in the optical storage layer are accessible by the same optics.

* * * * *